US008892490B2

(12) United States Patent
Wang et al.

(10) Patent No.: US 8,892,490 B2
(45) Date of Patent: Nov. 18, 2014

(54) DETERMINING WHETHER A POINT IN A DATA STREAM IS AN OUTLIER USING HIERARCHICAL TREES

(75) Inventors: Song Wang, Austin, TX (US); Chetan Kumar Gupta, Austin, TX (US); Abhay Mehta, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 590 days.

(21) Appl. No.: 12/887,965

(22) Filed: Sep. 22, 2010

(65) Prior Publication Data

US 2012/0072390 A1 Mar. 22, 2012

(51) Int. Cl.
*G06N 5/02* (2006.01)

(52) U.S. Cl.
CPC ........................................ *G06N 5/02* (2013.01)
USPC ............................................................ 706/46

(58) Field of Classification Search
None
See application file for complete search history.

(56) References Cited

U.S. PATENT DOCUMENTS

| | | | | |
|---|---|---|---|---|
| 6,778,995 | B1 * | 8/2004 | Gallivan | 707/739 |
| 7,668,843 | B2 * | 2/2010 | Ertoz et al. | 706/20 |
| 7,792,770 | B1 * | 9/2010 | Phoha et al. | 706/45 |
| 8,504,876 | B2 * | 8/2013 | Mork et al. | 714/37 |
| 2005/0207413 | A1 | 9/2005 | Lerner | |
| 2006/0282425 | A1 | 12/2006 | Aggarwal et al. | |
| 2007/0226212 | A1 * | 9/2007 | Aggarwal et al. | 707/6 |

OTHER PUBLICATIONS

Gupta, Chetan et al.; "Outlier Detection with Streaming Dyadic Decomposition"; 2007; Springer-Verlag; ICDM 2007, LNAI 4597; pp. 77-91.*
Gupta, Chetan; "Algorithms to Idenify Clusters and Outliers Based on Dyadic Deomposition with Applications to Streams"; 2006; Doctoral Dissertation; University of Illinois at Chicago; pp. iv-xi and 1-5.*
Liang Su et al., "Continuous Adaptive Outlier Detection on Distributed Data Streams," School of Computer Science National University of Defense Technology Changsha, China, pp. 73-83, Springer-Verlag 2007.
Xinjie Lu et al., "Incremental Outlier Detection in Data Streams Using Local Correlation Integral," 2009, pp. 1520-1521.
Osnat Horovitz et al, "A Fuzzy Approach for Interpretation of Ubiquitous Data Stream Clustering," http://www.liaad.up.pt/~jgama/IWKDDS/Papers/p3.pdf, (12 pages), 2005.
C.C. Aggarwal et al., "A Framework for Projected Clustering of High Dimensional Data Streams," Proceedings of the 30th VLDB Conference, 2004.
Angiulli et al., "Detecting Distance-Based Outliers in Streams of Data," CIKM 2007, pp. 811-820.
Bolton et al., "Unsupervised Profiling Methods for Fraud Detection," Proc. Credit Scoring and Credit Control VII, 2001, pp. 5-7.
Chandola et al, "Outlier Detection: A Survey," 2007.
Ertz et al, "Minds—Minnesota Intrusion Detection System," Data Mining—Next Generation Challenges and Future Challenges, 2004.

(Continued)

*Primary Examiner* — Stanley K Hill

(57) ABSTRACT

A technique that includes receiving a data stream that is indicative of a plurality of multi-dimensional points in a processor-based machine and for each dimension, organizing data indicative of values of the points in the dimension in an associated hierarchical tree. The technique includes using the processor-based machine to determine whether a given point of the plurality of points is an outlier based on a combination of the trees.

22 Claims, 5 Drawing Sheets

(56) References Cited

OTHER PUBLICATIONS

Gupta et al., "Outlier Detection With Streaming Dyadic Decomposition," Industrial Conference on Data Mining, 2007, pp. 77-91.

Jagdish et al., "Mining Deviants in a Time Series Data Base," Proceedings of Int'l Conference on Very Large Databases, VLDB, 1999.

Knorr, et al., "Algorithms for Mining Distance Based Outliers in Large Datasets," Proceedings of Int'l Conference on Very Large Databases, VLDB 1998, pp. 392-402.

Muthukrishnan et al., Mining Deviants in Time Series Data Streams, Technical Report DIMACS TR 2003-43.

Ramaswamy et al., Efficient Algorithms for Mining Outliers from Large Data Sets, Proceedings of the ACM Int'l Conference Management of Data, SIGMOD, 2000, pp. 427-438.

Zhu et al., "Efficient Elastic Burst Detection in Data Streams," Proceedings of the ninth ACM SIGKDD Int'l Conference of knowledge discovery and data mining, 2003, pp. 336-345.

* cited by examiner

DETERMINING WHETHER A POINT IN A DATA STREAM IS AN OUTLIER USING HIERARCHICAL TREES

TECHNICAL FIELD OF THE INVENTION

The invention generally relates to determining whether a point in a data stream is an outlier using hierarchical trees.

BACKGROUND

Large volumes of data are often processed for purposes of identifying and acting on events that are "outliers." As examples, a financial institution may monitor credit card transaction data for purposes of identifying outliers to detect fraudulent transactions; and image scan data (magnetic resonance imaging (MRI) scan data, for example) may be processed to identify outliers to detect tissue abnormalities.

The processed data may be a real time or near real time stream of data, which has multidimensional points. For example, a stream of credit card transaction data has points (the credit card transactions), which each have various dimensions, such as time of the transaction, the amount of purchase, goods or services classifier, the merchant city, the merchant country, etc. Whether a particular point is an outlier depends at least in part on the dimensions that are considered.

BRIEF DESCRIPTION OF THE DRAWING

FIG. 7 is a flow diagram depicting a technique to identify an outlier and determine a scale associated with the outlier according to an example implementation.

DETAILED DESCRIPTION

In accordance with exemplary implementations, systems and techniques are disclosed herein for purposes of identifying outliers in a continuous heterogeneous stream of multi-dimensional data. In this regard, in accordance with an exemplary implementation, an application is constructed to monitor a data stream for purposes of identifying outliers, and this identification may be constrained by such parameters as the dimensions being considered as well as the length of the sliding segment, or window, of the stream to be examined. For example, assuming that the application monitors a stream of credit card transaction data, a user may submit a query to the application to constrain the application's search for outliers. The query specifies the dimensions (purchase amount, merchant location, etc.) and the length of the sliding window (i.e., how many recent transactions) to be considered.

Different users may have different criteria for identifying outliers, and as such, a single query may not accommodate multiple users of the application who may be interested in identifying outliers for different sets of dimensions and sliding window sizes. Therefore, in general, each user may submit a query, which specifies the dimensions and the sliding window size. As described herein, the application responds to each of these queries to provide a continuously updated list of outliers over the specified dimensions along with a measure of the degree of the outlier's "outlierliness."

Figure 1:
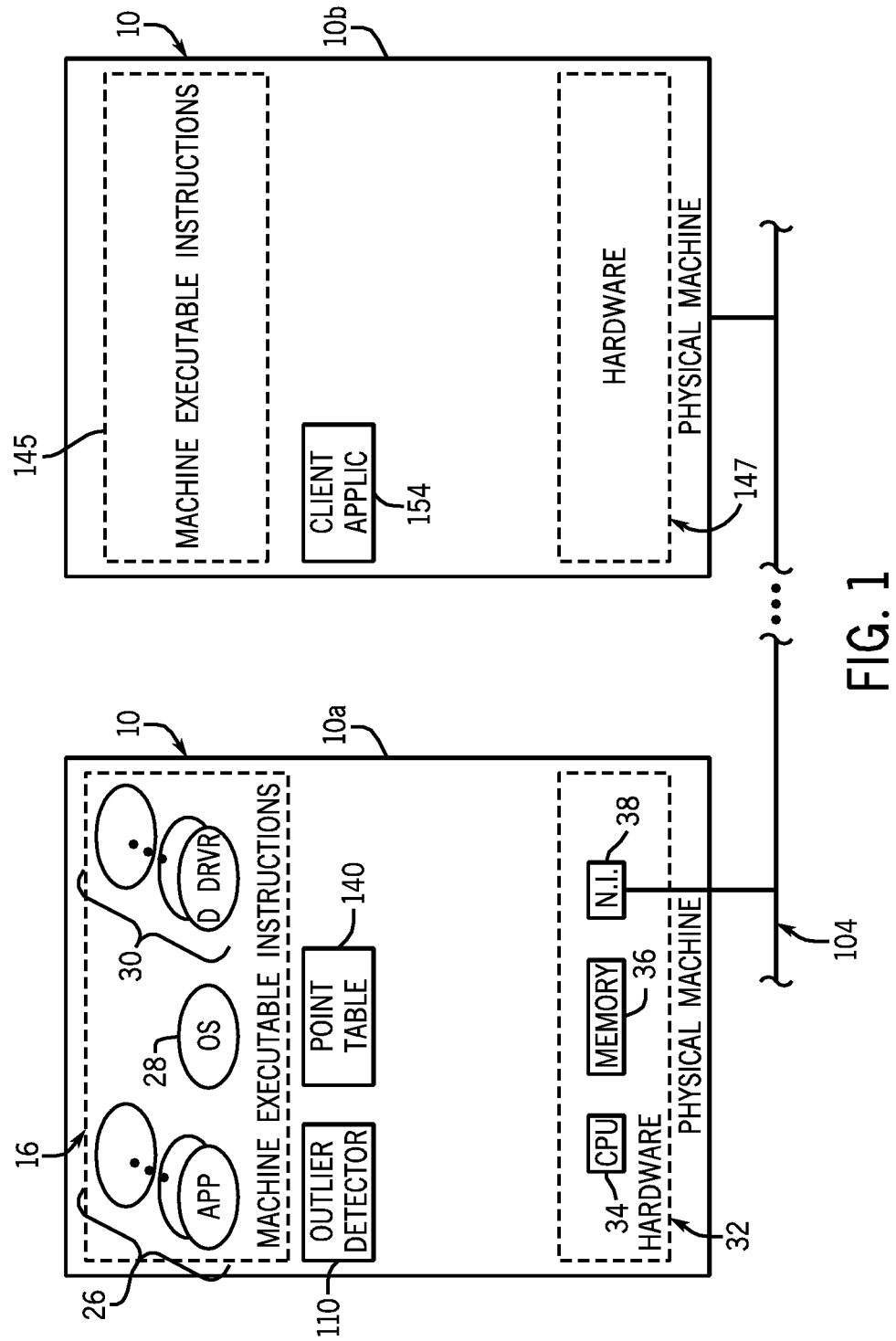
FIG. 1 is a schematic diagram of a processing system according to an example implementation.

Referring to FIG. 1, as a non-limiting example, the systems and techniques that are disclosed herein may be implemented on an architecture that includes one or multiple physical machines 10 (physical machines 10a and 10b, being depicted in FIG. 1, as examples). In this context, a "physical machine" indicates that the machine is an actual machine made up of executable program instructions and hardware. Examples of physical machines include computers (e.g., application servers, storage servers, web servers, etc.), communications modules (e.g., switches, routers, etc.) and other types of machines. The physical machines may be located within one cabinet (or rack); or alternatively, the physical machines may be located in multiple cabinets (or racks).

As shown in FIG. 1, the physical machines 10 may be interconnected by a network 104. Examples of the network 104 include a local area network (LAN), a wide area network (WAN), the Internet, or any other type of communications link. The network 104 may also include system buses or other fast interconnects.

In accordance with a specific example described herein, one of the physical machines 10a contains machine executable program instructions and hardware that executes these instructions for purposes of identifying outliers in streaming data in response to various user queries, which each specify the dimensions of the query as well as the size of a sliding window of the streaming data to be examined. In this manner, the processing by the physical machine 10a results in data indicative of identified outliers and data indicative of scales associated with the identified outliers. Another one of the physical machines 10b for this example represents the environment in which a user may submit a query to the machine 10a for purposes of specifying the constraints for identifying the outliers.

It is noted that in other implementations, the architecture may include additional physical machines 10 associated with sources of the streaming data. For example, these other physical machines may be associated with merchants that collect credit card information to form a stream of monitored data, which is monitored by the physical machine 10a for purposes of identifying outliers.

It is noted that in other implementations, all or part of the above-described outlier identification and query submissions may be implemented on a single physical machine 10 or on more than two physical machines 10. Therefore, many variations are contemplated and are within the scope of the appended claims.

The architecture that is depicted in FIG. 1 may be implemented in an application server, a storage server farm (or storage area network), a web server farm, a switch or router farm, other type of data center, and so forth. Also, although two physical machines 10a and 10b are depicted in FIG. 1, it is noted that more than two physical machines 10 or one physical machine 10 may be used in accordance with other implementations. Additionally, although each of the physical machines 10 is depicted in FIG. 1 as being contained within a box, it is noted that a physical machine 10 may be a distributed machine having multiple nodes, which provide a distributed and parallel processing system.

As depicted in FIG. 1, in some implementations the physical machine 10a may store machine executable instructions 16. These instructions 16 may include one or multiple applications 26, an operating system 28 and one or multiple device drivers 30 (which may be part of the operating system 28). In general, the machine executable instructions are stored in storage, such as (as non-limiting examples) in a memory (such as a memory 36) of the physical machine 10, in removable storage media, in optical storage, in magnetic storage, in non-removable storage media, in storage separate (local or remote) from the physical machine 10, etc., depending on the particular implementation.

The physical machine 10a may also include hardware 32, which includes a processor, such as one or multiple central processing unit (CPUs) 34 (one CPU 34 being depicted in FIG. 1 for purposes of a non-limiting example). Each CPU 34 may have one or multiple processing cores. The hardware 32 may also include the system memory 36 and a network interface 38. In some implementations, one or multiple CPUs 34 execute the machine executable instructions 16.

Figure 2:
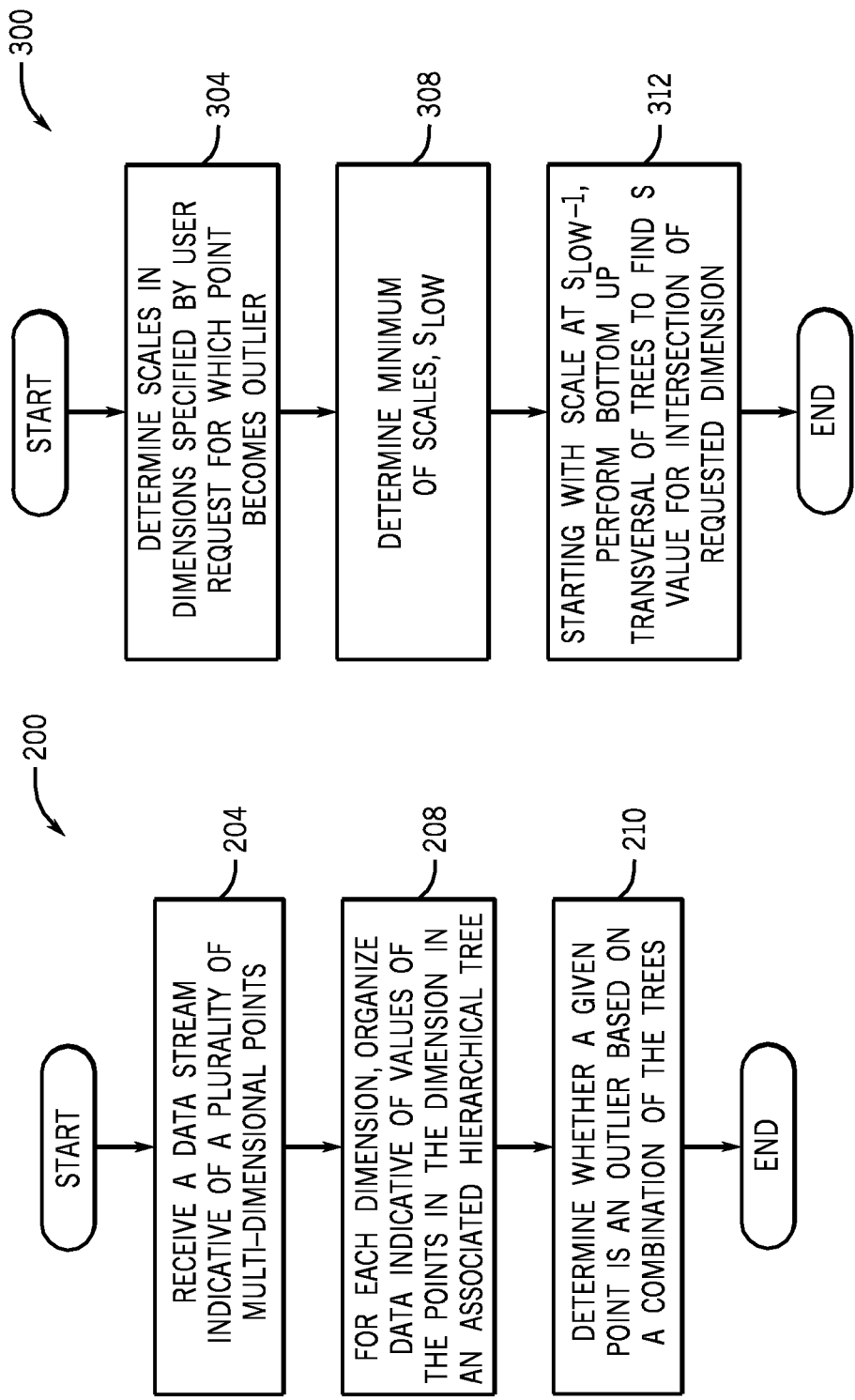
FIG. 2 is a flow diagram depicting a technique to detect an outlier according to an example implementation.

In general, the physical machine 10a, for this example, includes a set of machine executable instructions, called an "outlier detector 110," which is responsible for, in response to user queries, monitoring a data stream and identifying outliers and scales associated with the identified outliers. Referring to FIG. 2 in conjunction with FIG. 1, in particular, in accordance with embodiments of the invention, the outlier detector 110 may perform a technique 200 that is depicted in FIG. 2 for purposes of identifying outliers. Pursuant to the technique 200, the outlier detector 110 receives (block 204) a data stream indicative of a plurality of multidimensional points in a processor-based machine. As a non-limiting example, the data stream may be a stream of credit card transaction data, and each "point" may be a credit card transaction, which has dimensions associated with a value of the transaction, a location of the merchant, an identifier indicative of the type of goods sold by the merchant, etc. Pursuant to the technique 200, the outlier identifier 110, for each dimension, organizes (block 208) data indicative of values of the points in that dimension in an associated hierarchical tree. As described further below, each hierarchical tree permits the outlier detector 110 to determine whether different points are neighbors (and thus, whether the points are outliers) in a given dimension. The outlier detector 110 determines whether a given point is an outlier based on a combination of the appropriate trees (depending on the dimensions that are specified by the user query), pursuant to block 210.

Referring back to FIG. 1, in general, the physical machine 10b may contain machine executable instructions 145 and hardware 147. For this example, the physical machine 10b represents the specific machine associated with the client and as such, includes a set of machine executable instructions, called a "client application 154," which when executed by one or multiple CPUs of the physical machine 10b communicates one or more user queries over the network 104 to the physical machine 10a. The architecture depicted in FIG. 1 may contain other applications and/or other physical machines for purposes of submitting queries to the outlier detector 110. Moreover, the architecture depicted in FIG. 1 may contain more than one outlier detector.

Figure 3:
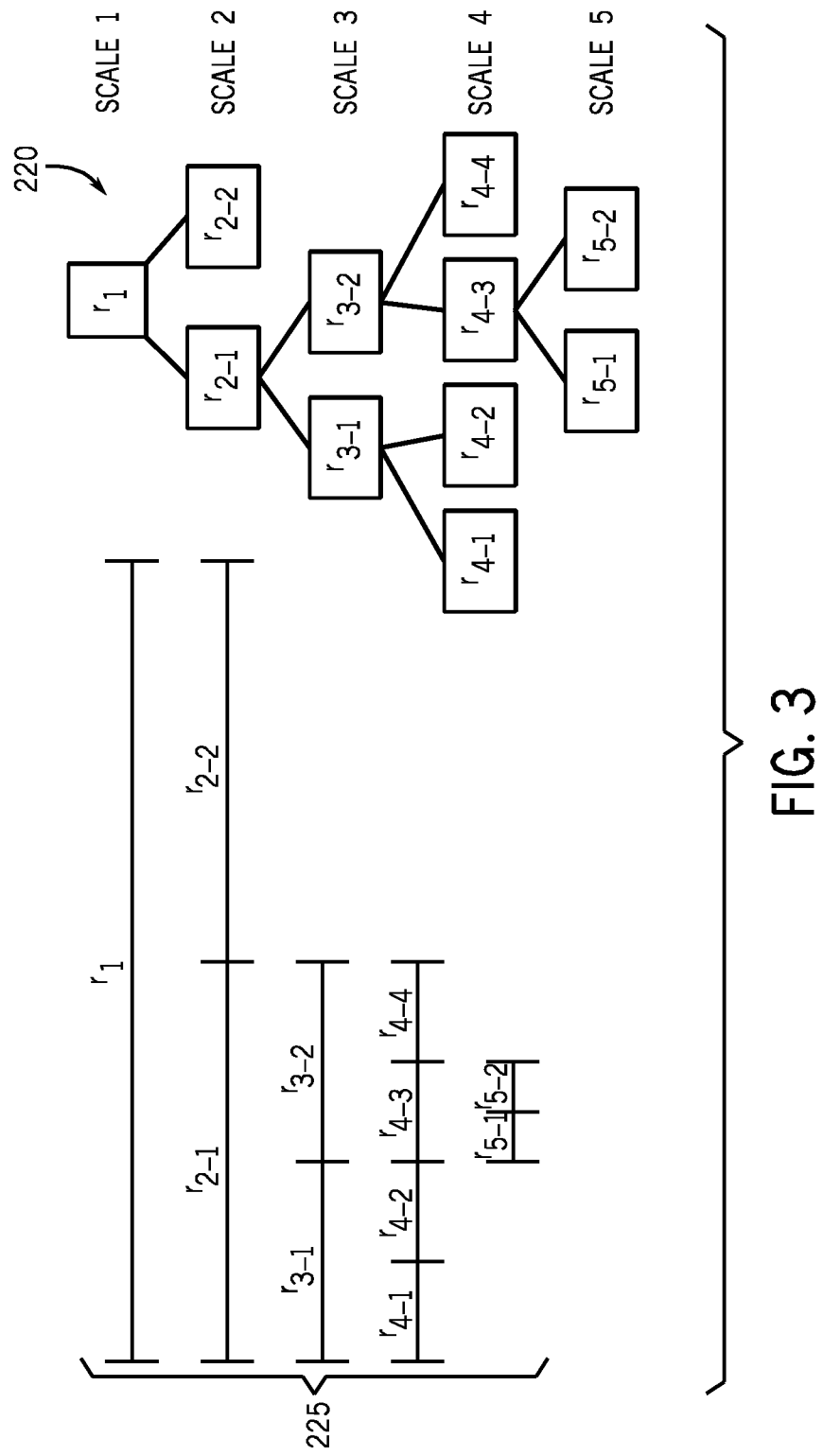
FIGS. 3, 4 and 5 are illustrations of example implementations of hierarchical trees for continuous valued attributes.

The above-mentioned hierarchical trees represent a scale-based division of space, where each level of the tree corresponds to a scale at which an attribute (the value of a point in a particular dimension) is being studied. An example of a particular hierarchical tree 220 for a continuous value attribute is depicted in FIG. 3. As shown in FIG. 3, the tree 220 includes nested ranges, where an attribute is inserted in the right series of nested ranges based on its value in the dimension on which the tree is built. As a more specific example, FIG. 3 also depicts a corresponding organization 225 of ranges for a subdivision of a range $r_1$. For example, if it is assumed that the range $r_1$ equals [0 . . . 1] and an attribute with a value of 0.3 is stored in the hierarchical tree 220, then the attribute belongs to the ranges $r_1$, $r_{2-1}$, $r_{3-2}$, $r_{4-3}$ and $r_{5-1}$.

The scales provided by the hierarchical trees aid in quantifying the "outlierliness" of an outlier, meaning that more obvious outliers are detected at a coarser scale, and the less obvious outliers are detected at a finer scale. In the following description, a lower numerical value for a scale denotes a coarser scale, and a relatively higher numerical value of the scale denotes a finer scale. For example, for the hierarchical tree 220 of FIG. 3, "scale 1" denotes the coarsest scale, and "scale 5" denotes the finest scale.

Scale-based outlier detection is useful for both the reasons of performance and functionality. Moreover, scale-based outlier detection is dynamic as it adjusts for varying data rates. Another advantage of a scale-based study is that it leads to better understanding of the data. For example, if it is assumed that a study is being made of the densities and geographic locations of various cities in the Unites States (based on the three-dimensional set of longitude, latitude and density), then New York, being the densest city, is an outlier at a lower scale, whereas Phoenix is an outlier at a higher scale since Phoenix is a dense city in the primarily sparsely populated state of Arizona.

As described herein, the outliers are determined based on the concept of scale-based neighborhoods. More specifically, a scale-based neighborhood of a point p at scale s is a set of all those points q ∈ S, such that for all dimensions i ∈ [1 . . . d], $D_i(p,q) < \lambda_{s,i}$, where "$D_i(p,q)$" is the distance function. This implies that if a point p has a neighbor q in the scale-based neighborhood, the point p is not an outlier. Otherwise there is no point q in the neighborhood, and as such, point p is an outlier. This definition implies that a point p is not an outlier if the point p has one neighbor may be extended in accordance with other implementations such that the number of neighbors for a point p not to be an outlier may be greater than one.

Thus, a point p is an outlier if the number of points in its scale-based neighborhood is less than or equal to a threshold T. This definition not only specifies an outlier but also specifies the scale associated with the outlier. This scale is essentially the measure of the "outlierliness" of a point deemed to be an outlier. Because $\lambda_{s,I} \geq \lambda_{(s,i)}$ (for I<=i), as the scale increases its scale-based neighborhood becomes smaller. Therefore, a point which is an outlier at a coarser scale has a further degree of "outlierliness" than a point which is an outlier at a finer scale. Thus, a point p which is an outlier at scale s is an outlier at all scales s' greater than s.

A particular attribute for a given dimension of a point may be a continuous valued attribute or a categorical attribute. In this manner, a continuous valued attribute may be a number in a certain numerical range, whereas a categorical attribute is a set of valued attributes such as, for example, attributes that describe whether a food item is, for example, a fruit or a vegetable. For continuous valued attribute (called "A "), a simple assumption is made that the minimum (called "$A_{min}$") and the maximum (called "$A_{max}$") values of the attribute A are known. For continuous valued attribute A, the distance $D_A(p, q)$ between any two points (p, q) may be naturally assumed to be $D_A(p,q) = |p_A - q_A|$.

Figure 4:
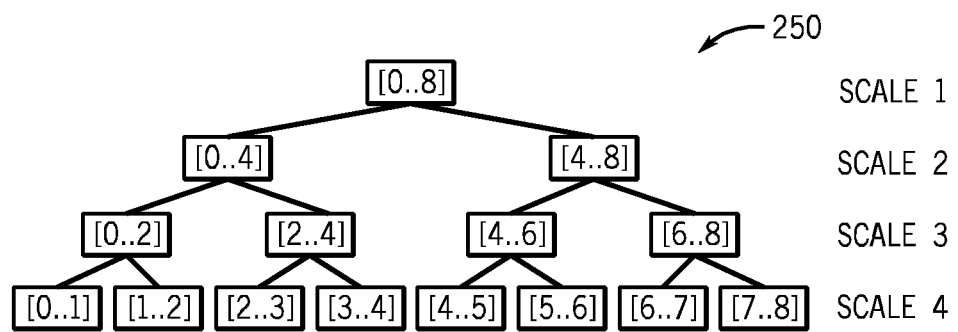
Figure 5:
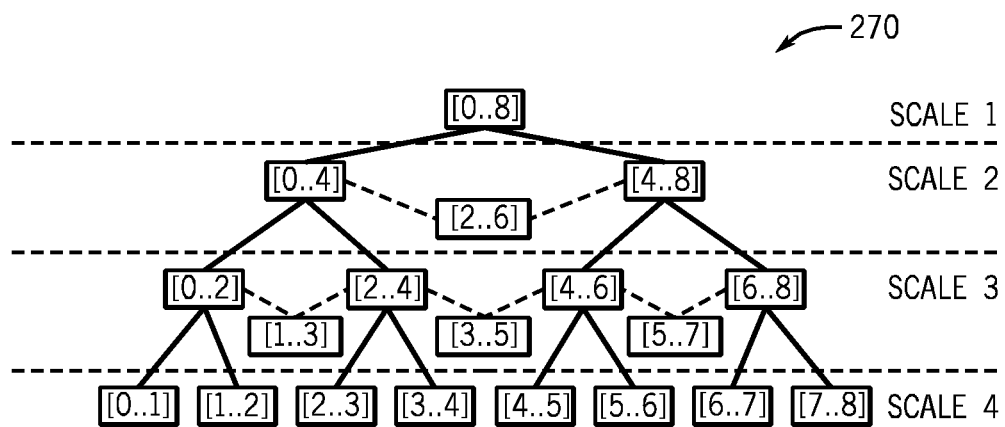

The hierarchical tree 220 of FIG. 3 is for a continuous valued attribute where the unit interval is repeatedly bisected. This bisection may be generalized so that the range of the $j^{th}$ node at scale s (where s equals L+1 (where "L" is the level of the tree)) may be represented as follows:

$$\left[(j-1) \times \frac{A_{max} - A_{min}}{2^{s-1}}, j \times \frac{A_{max} - A_{min}}{2^{s-1}}\right], \quad \text{Eq. 1}$$

where $j=[1 \ldots 2^{s-1}]$. For $j=1 \ldots 2^{s-1}$, the range is closed on the right hand side. An exemplary tree 250 according to this bisection is depicted in FIG. 4. This tree is known as a dyadic tree in one dimension. However, this type of tree introduces an error at some intermediate points, such as at point p=4 at scale 2 in FIG. 4. With $$\lambda_s = \frac{L}{2^2},$$

then the scale-based neighborhood (as defined in Definition 2) of p=4 at scale 2 should be [2 ... 6] (($\frac{8}{2^2}$=2,[(4−2) ... (4+2)])). However, as shown in FIG. 4, the neighborhood of point p is [4 ... 8]. To overcome this deficiency, an extended dyadic tree may be used where for every partition an intermediate node is constructed. An exemplary extended dyadic tree 270 is depicted in FIG. 5.

In an extended dyadic tree, besides the $2^{s-1}$ nodes at scale s in the dyadic tree, $2^{s-1}-1$ additional nodes are constructed, where range of the $j^{th}$ such node at scale s, is given by:

$$\left[(j-1) \times \frac{A_{range} - A_{range}}{2^{s-1}} + \frac{A_{range} - A_{range}}{2^{s-2}}, \right.$$
$$\left. j \times \frac{A_{range} - A_{range}}{2^{s-1}} + \frac{A_{range} - A_{range}}{2^{s-2}} \right], \quad \text{Eq. 2}$$

where $A_{range}=A_{max}-A_{min}$ and $j=[1 \ldots 2^{s-1}]$. In accordance with implementations, the hierarchical trees described herein for continuous variables are the form of the extended dyadic tree, giving rise to the following lemma: for a point p, continuous valued attribute A, $$\lambda_s = \frac{L}{2^2}$$

and any point q such that $|p_A - q_A| < \lambda_s$, then there is a node at scale s in trees which contains both p and q.

It is noted that all scale-based neighbors to a point p exist in the same node as point p. for an extended tree, but not only point p's neighbors exist in the same node as point p, as this is the approximation that the tree introduces. In terms of outliers, the tree indicates that for a scale s, using the tree results in no false positives but some false negatives at that scale s. However, because all of point p's neighbors are included, if point p is not an outlier, then point p is not reported as an outlier. However, some points, which are not neighbors of point p are counted as neighbors. Therefore, point p may not be an outlier, where it is. This problem is rectified at scale s+1, and if a point p has no neighbors at scale s for a dimension, then the point p will not have any neighbors at scale s+1. Stated differently, the maximum span of any node of scale s+1 is $\lambda_s$. This implies that if a point is missed as an outlier as scale s, then the outlier is identified at scale s+1, except for the largest scale.

Categorical data is an example of a set of valued attributes, i.e., there is a known set of values, say $A_i, i \in [1 \ldots k]$, and the value of every attribute belongs to this set. Such categories can be represented in terms of a hierarchical relationships. Every level in the hierarchy then represents a neighborhood.

Figure 6:
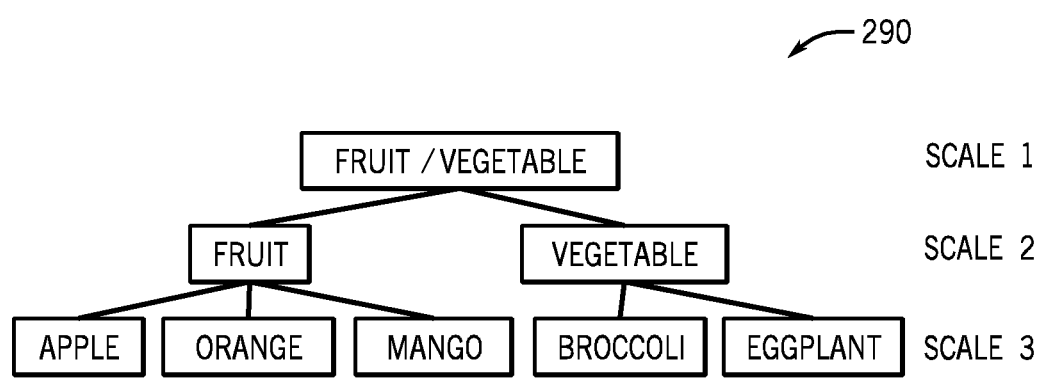
FIG. 6 is an illustration of an example implementation of a hierarchical tree for a categorical attribute.

Referring to FIG. 6, as an example, a tree 290 for a categorical attribute may have the following categories: apple, orange, mango, broccoli and eggplant. According to the tree 290, at scale 1, elements belonging to any category are neighbors; at scale 2, all the fruits are neighbors of each other and all the vegetables are neighbors of each other but the fruits and vegetables are not each other's neighbors; and at scale 3, the neighborhood relationship is specified by all the individual fruit types and vegetable types.

It is assumed that all trees have the same maximum scale, called "$s_{max}$." In the case of categorical variables, the depth of the natural hierarchy might be less than $s_{max}$. In such a scenario, it is assumed that the structure at the leaves of the natural hierarchy is replicated until $s_{max}$ is reached. This does not affect the accuracy of the results since an outlier at scale s is an outlier at all scales s' greater than s.

If two points p and q have the same value for a categorical variable, then the points are always in the same node of the tree. It is noted that for purposes of determining neighbors for categorical variables, the actual distances between the various categories are not specified. All that is specified is a scale-based neighborhood relationship, which avoids the otherwise challenging problem of specifying distances between categories. This still leaves the user with the challenge of specifying a scale for the neighborhood relationship. For example, in the above example, the natural definition of scale-based neighborhoods was used. There are other definitions possible, for example, in accordance with other implementations. For example, instead of counting each level of the tree as one scale, each level, in accordance with implementations may be counted as two scales, meaning, for example, that vegetable exists at scales 2 and 3; and broccoli and eggplant are at scale 4. Scaling creates an implicit relationship between various dimensions, which is specified by the user.

For each dimension of a point, a hierarchical tree is determined to a depth of some scale $s_{max}$. For each dimension i, the hierarchical tree stores a point p's neighbors $S_i$ in that dimension i. To compute the outliers, an indication of the intersection of these sets $S_i$ is determined. For d dimensions, d−1 intersections are needed per scale. For example, to compute $A \cap B \cap C \cap D$, there are three intersections, $A \cap B$, $C \cap D$, and $\{A \cap B\} \cap \{C \cap D\}$. The results of the intersections are not really needed, but rather cardinality of the intersections is needed, since the definition of outliers is dependent just on the cardinality of the intersections. Based on this, a three step technique for approximation may be used. For a given a set of dimensions, the expected value $E_{int}$ of the cardinality of intersection is determined. If $E_{int}$ is greater than threshold, then the actual intersection is not determined and it is assumed that the point is not an outlier. Otherwise, the actual intersection is calculated to determine whether the point is an outlier.

It is relatively straightforward to compute $E_{int}$ for purposes of determining whether if the intersection calculation is needed and such, may be performed to reduce the number of intersection calculations For example, there are two sets A and B, with the number of points in the sets be $n_A$ and $n_B$, respectively. If the total number of points is n, a point from A and B may be chosen with probabilities $$\frac{n_A}{n} \text{ and } \frac{n_B}{n}$$

respectively. Then the probability that a point is in both A and B is $$\frac{n_A}{n}, \frac{n_B}{n}.$$

The expected value $E_{int}$ may be determined according to $$E_{int} = \sum_{i=1}^{n} \frac{n_A}{n} \frac{n_B}{n} = \frac{n_A n_B}{n}.$$

In general for d sets, the expected value $E_{int}$ may be described as follows:

$$E_{int} = \frac{\prod_{i=1}^{d} n_i}{n^{d-1}}. \qquad \text{Eq. 3}$$

In accordance some implementations, the point table 140 (see FIG. 1) includes an encoding for each path in the tree of a certain dimension from the root to the leaf. For any point in the current sliding window, the point table uses the following schema: (PointID, $\text{Scale}_{dim_A}$, $\text{LeafIndex}_{dim_A}$, . . . ). The pair ($\text{Scale}_{dim_i}$, $\text{LeafIndex}_{dim_i}$) specifies the position of the space partition that the point falls into in the tree of dimension i. The $\text{Scale}_{dim_i}$ is the smallest scale when the point becomes an outlier in the associated single dimension $dim_i$ or the maximum scale that is considered. By definition of the hierarchical tree, the point is an outlier for any scale larger than $\text{Scale}_{dim_i}$ for dimension $dim_i$. The range of $\text{LeafIndex}_{dim_i}$ is $[0, 2^{\text{Scale}_{dim_i}} - 1]$. As a more specific example, exemplary points p1 to p5 may be stored in the following exemplary point table 140:

TABLE 1

| PointID | Scale_A | LeafIndex_A | Scale_B | LeafIndex_B |
|---|---|---|---|---|
| 1 | 2 | 001 | 4 | 111 |
| 2 | 4 | 111 | 4 | 100 |
| 3 | 4 | 111 | 4 | 111 |
| 4 | 4 | 111 | 4 | 111 |
| 5 | 4 | 111 | 4 | 101 |

The leaf index code may be calculated by the value of the data point in the corresponding dimension. For example, if the domain size of the dimension is (0,1) and the value is 0.23, then for max scale 4, the code is $$\frac{(0.23 - 0) \cdot 2^{4-1}}{1 - 0}.$$

During insertion into the tree in a top-down mode, the scale value may be calculated by counting the size of the partition for the dimension.

The benefit of using such encoding is to facilitate the traversal of the hierarchical tree for various scales. For example, point $p_5$'s index for dimension B is (4, 101). By bitwise shifting right, [(4, 101)→(3, 10)→(2, 1)→(1, 0)], the partitions of point p5 may be derived at different scales.

In response to a given user query, an intersection is determined among the point sets on the given dimensions specified by the query. Intuitively, all of the common subsets for a combination of the partitions in the multi-dimensional space are tracked. For example, if the maximum hierarchical trees are $h_1, h_2, \ldots, h_d$ for dimensions 1 to d, then there needs to be $2^{h_1 h_2 \cdots h_d}$ number of common subsets will need to be maintained, which is infeasible in most practical cases Instead of using such an approach, in accordance with some implementations, an approach is used in which a determination is made only if a common subset is empty or not to determine the outliers. For each distinct dimension combination specified by a query, a corresponding scale value (called the "s value") for each data point is determined. The s value is the small scale when the point becomes an outlier in the specified dimensions. The s-value, which is determined by the outlier detector 110, is provided to user along with the determined outlier for purposes of informing the user as to the "outlierliness" of the determined outlier.

For an incoming stream tuple (i.e., a multi-dimensional point), the incremental computation of its s-value s for a given dimension combination (D={$d_1, d_2, \ldots d_n$}, may be performed as follows. First, for each single dimension $d_i \in D$ the s-value $s_i$ in the point table 140 is determined for corresponding dimension. A data point will be an outlier if it is already an outlier for subset dimensions. The minimal value of these s-values $s_{low} = \min(s_1, \ldots, s_n)$ is the lower bound for s.

Next, from the $s_{low}-1$ scale, the hierarchical tree is traversed from the bottom up to find its real s-value for D. First, t is set equal to $s_{low}-1$, and the common data points in the trees at scale t for all the dimensions in D are found. Note that the data points in the hierarchical trees are all naturally sorted by the timestamps, so a linear merge-sort-like algorithm can be used to find the intersection. For data point p and its neighbors (referred to below as common points) at t, one and only one of the following cases exist.

If point p's s-value $s_p$>t, then the s-value of the new point s=t+1, as no more searching for common data point and no modification of s-values for existing points are needed. The reason is that according to transitive property of the points in the neighborhood, point p already has enough neighbors at scale t to make the new point not an outlier, i.e., the s-value of the new point is at-least t+1.

If point p's s-value $s_p$==t, then all the other common points are checked to determine if they are still outliers. They might no longer be outliers, since a new point has been added as a neighbor.

If point p's s value $s_p$<t, then all the other common points are used and checked if they are outliers. Here, all the other common points have the same s-value as point p. This is due to the transitive property. If they are still outliers at scale t, t is set equal to t−1, and the bottom-up tree traversal is repeated.

When a point is deleted it is essentially an inverse of the operations above. Deleting a point can cause other points to be outliers. So, the common points are checked to see if these points are outliers.

Although the worst case processing cost for a new tuple is O(N), which makes the overall cost O($N^2$). In practice, the processing cost of a new tuple is roughly constant and makes the total cost closer to O(N). Similar steps are followed for purposes of purging an old data point from this sliding window.

Thus, to summarize, in accordance with implementations of the invention, the outlier detector 110 may perform a technique 300 that is depicted in FIG. 7. Referring to FIG. 7 in conjunction with FIG. 1, pursuant to the technique 300, the outlier detector 110 determines (block 304) scales in dimensions specified by a user request for which a point becomes a outlier. The outlier detector 110 determines (block 308) the minimum of the scales, called "$s_{low}$." The outlier detector 110, starting with scale at $s_{low-1}$ performs a bottom-up traversal of the trees to find the s value for the intersection of the requested dimension, pursuant to block 312.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
receiving a data stream indicative of a plurality of multi-dimensional points in a processor-based machine; and
using the processor-based machine to determine whether a given point of the plurality of points is an outlier comprising:
for each dimension of the given point, determining a hierarchical tree for said each dimension, wherein the hierarchical tree represents a set of neighbors of the given point in said each dimension for a plurality of scales and the hierarchical tree is not associated with any dimension of the point other than said each dimension; and
basing the determination of whether the given point is an outlier at least in part on a combination of the trees.

2. The method of claim 1, wherein determining the hierarchical tree comprises arranging the data in the hierarchical tree according to a scale based division of space.

3. The method of claim 1, further comprising:
receiving a user inquiry specifying a window of the data stream and a set of dimensions; and
further basing the determination of whether the given point is an outlier based on the window and the set of dimensions.

4. The method of claim 3, further comprising:
receiving another user inquiry specifying another set of dimensions; and
determining whether the given point is an outlier based at least in part on said another set of dimensions.

5. The method of claim 1, wherein a user request specifies a set of dimensions for determining whether the given point is an outlier and the using the processor-based machine to determine whether the given point is an outlier further comprises:
determining an associated set of at least one neighbor for each dimension specified by the user request; and
further basing the determination of whether the given point is an outlier on an intersection of the associated sets.

6. The method of claim 5, wherein said given point is an outlier and determining the intersection comprises determining a scale associated with the outlier.

7. The method of claim 6, wherein the act of determining the scale comprises:
for each dimension, determining a minimum scale at which the given point becomes an outlier in the dimension; and
traversing the hierarchical trees to identify the minimum scale.

8. The method of claim 1, wherein the organizing comprises:
providing a table; and
for each multi-dimensional point, storing an identification of the point and scales at which the point becomes an outlier in each dimension according to the hierarchical trees.

9. A system comprising:
a memory; and
a processor-based outlier detector to:
monitor a user specified time window of streaming data, the streaming data being indicative of a plurality of multi-dimensional points;
for each of the dimensions, store data in the memory indicative of a hierarchical tree for said each dimension, wherein the hierarchical tree represents a set of neighbors of a given point in said each dimension for a plurality of scales and the hierarchical tree is not associated with any dimension of the given point other than said each dimension; and
selectively combine the hierarchical trees based on a user specified set of dimensions to determine whether the given point of the plurality of points within the window is an outlier.

10. The system of claim 9, wherein the outlier detector is adapted to arrange the data in a hierarchical tree according to a scale based division of space.

11. The system of claim 9, wherein the outlier detector is further adapted to, for each dimension specified by the user, determine an associated set of neighbors and further base the determination on an intersection of the associated sets of neighbors.

12. The system of claim 11, wherein said given point is an outlier and the outlier detector determines the intersection in a process that includes determining a scale associated with the outlier.

13. The system of claim 12, wherein the outlier detector is adapted to for each dimension, determine a minimum scale at which the given point becomes an outlier in the dimension and traverse the hierarchical trees to identify the minimum scale.

14. An article comprising a non-transitory computer readable storage medium storing instructions that when executed by a computer cause the computer to:
receive a data stream indicative of a plurality of multi-dimensional points;
for each dimension, determine a hierarchical tree for said each dimension, wherein the hierarchical tree represents a set of neighbors of a given point in said each dimension for a plurality of scales and the hierarchical tree is not associated with any dimension of the given point other than said each dimension; and
determine whether the given point of the plurality of points is an outlier based on a combination of the trees.

15. The article of claim 14, the storage medium storing instructions that when executed by the computer cause the computer to arrange the data in the hierarchical tree according to a scale based division of space.

16. The article of claim 14, the storage medium storing instructions that when executed by the computer cause the computer to receive a user inquiry specifying a window of the data stream and a set of dimensions and further base the determination of whether the given point is an outlier based on the window and the set of dimensions.

17. The article of claim 16, the storage medium storing instructions that when executed by the computer cause the computer to:
receive another user inquiry specifying another set of dimensions; and
determine whether the given point is an outlier based at least in part on said another set of dimensions.

18. The article of claim 14, wherein said given point is an outlier, and
the storage medium storing instructions that when executed by the computer cause the computer to:
for each dimension specified by the user, determine an associated set of neighbors and further base the determination of an intersection of the associated sets of neighbors; and
determine the intersection by determining a scale associated with the outlier.

19. The article of claim 14, the storage medium storing instructions that when executed by the computer cause the computer to for each dimension, determine a minimum scale at which the given point becomes an outlier in the dimension and traverse the hierarchical trees based on the minimum scale.

20. The article of claim 14, the storage medium storing instructions that when executed by the computer cause the computer to provide a table; and for each multi-dimensional point, store an identification of the point and scales at which the point becomes an outlier in each dimension according to the hierarchical trees.

21. The method of claim 1, wherein using the processor to determine whether a given point of the plurality of points is an outlier comprises determining a cardinality of intersections of the hierarchical trees.

22. The system of claim 9, wherein the processor-based outlier detector determines a cardinality of intersections of the hierarchical trees to determine whether the given point is an outlier.

* * * * *